(12) United States Patent
Yi et al.

(10) Patent No.: US 9,730,204 B2
(45) Date of Patent: Aug. 8, 2017

(54) METHOD AND APPARATUS FOR SUPPORTING TRANSMISSION EFFICIENCY IN A WIRELESS COMMUNICATION SYSTEM

(71) Applicant: LG Electronics Inc., Seoul (KR)

(72) Inventors: Yunjung Yi, Seoul (KR); Joonkui Ahn, Seoul (KR); Suckchel Yang, Seoul (KR); Bonghoe Kim, Seoul (KR); Dongyoun Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 14/648,317

(22) PCT Filed: Dec. 13, 2013

(86) PCT No.: PCT/KR2013/011575
§ 371 (c)(1),
(2) Date: May 29, 2015

(87) PCT Pub. No.: WO2014/092497
PCT Pub. Date: Jun. 19, 2014

(65) Prior Publication Data
US 2015/0296490 A1     Oct. 15, 2015

Related U.S. Application Data

(60) Provisional application No. 61/737,103, filed on Dec. 14, 2012.

(51) Int. Cl.
*H04W 72/04*     (2009.01)
*H04W 52/28*     (2009.01)
(Continued)

(52) U.S. Cl.
CPC ......... *H04W 72/042* (2013.01); *H04L 1/1812* (2013.01); *H04W 28/0268* (2013.01);
(Continued)

(58) Field of Classification Search
None
See application file for complete search history.

(56) References Cited

U.S. PATENT DOCUMENTS

2010/0034161 A1   2/2010  Luo et al.
2011/0098054 A1   4/2011  Gorokhov et al.
(Continued)

FOREIGN PATENT DOCUMENTS

| CN | WO 2012149674 A1 * | 11/2012 | ............ H04W 8/26 |
| JP | 2012521173 | 9/2012 | |

(Continued)

*Primary Examiner* — Hassan Phillips
*Assistant Examiner* — Gautam Sharma
(74) *Attorney, Agent, or Firm* — Dentons US LLP

(57) ABSTRACT

A method for and apparatus for supporting transmission efficiency in a wireless communication system is provided. A wireless device determines a message type based on information, the message type indicating a plurality of transmission types; and performs adaptive measurement, data process, and power control according to the message type. Herein the information indicates one of the plurality of candidate message types that are predefined or are defined by a RRC message.

12 Claims, 20 Drawing Sheets

(51) Int. Cl.
*H04L 1/18* (2006.01)
*H04W 28/02* (2009.01)
*H04W 52/14* (2009.01)
*H04W 52/32* (2009.01)
*H04W 52/40* (2009.01)

(52) U.S. Cl.
CPC ........ *H04W 52/281* (2013.01); *H04W 52/146* (2013.01); *H04W 52/325* (2013.01); *H04W 52/40* (2013.01)

(56) References Cited

U.S. PATENT DOCUMENTS

2012/0201162 A1    8/2012  Kim et al.
2012/0302240 A1*  11/2012  Tamaki ............. H04W 36/0011
                                                                455/436
2013/0083753 A1*   4/2013  Lee ................... H04W 72/0453
                                                                370/329

FOREIGN PATENT DOCUMENTS

KR    1020110027591    3/2011
WO       2012077971    6/2012

* cited by examiner

METHOD AND APPARATUS FOR SUPPORTING TRANSMISSION EFFICIENCY IN A WIRELESS COMMUNICATION SYSTEM

This application is a 35 USC §371 National Stage entry of International Application No. PCT/KR2013/011575 filed on Dec. 13, 2013, and claims priority to U.S. Provisional Application No. 61/737,103 filed on Dec. 14, 2012, all of which are hereby incorporated by reference in their entireties as if fully set forth herein.

TECHNICAL FIELD

The present invention relates to wireless communications, and more particularly, to a method and apparatus for supporting transmission efficiency in a wireless communication system consisting of multiple carriers over single frequency or multiple frequencies.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users demand for services that may support higher quality and higher capacity while ensuring mobility, as well as voice services. The LTE system provides for low transmission delay, high transmission rate and system capacity, and enhanced coverage.

To increase the capacity for the users's demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted (or eliminated) controls and UE in a small cell cluster environment needs to be defined.

DISCLOSURE

Technical Problem

The present invention provides a method and apparatus for supporting transmission efficiency in a wireless communication system consisting of multiple carriers over single frequency or multiple frequencies.

The present invention also provides a method and apparatus for commutating adaptively in order to meet dynamic QoS (Quality of service) in a wireless communication system consisting of multiple carriers over single frequency or multiple frequencies.

The present invention also provides a method and apparatus for supporting a small cell cluster efficiently for measurement and/or discovery in a wireless communication system supporting multiple carriers.

The present invention also provides a method and apparatus for handling non-CA capable UEs (i.e., UE with single RX/TX capability) and CA capable UEs in a wireless communication system supporting multiple carriers.

Technical Solution

In an aspect, a method for supporting a transmission efficiency in a wireless communication system is provided.

The method may include determining a message type based on information, the message type indicating a plurality of transmission types and performing adaptive measurement, data process, and power control according to the message type.

The method may further include that the information indicates one of the plurality of candidate message types that are predefined or are defined by a RRC message.

The method may further include that the message type includes information on whether a Channel State Information (CSI) measurement is enabled, information on whether a Hybrid automatic repeat request (HARQ) is set, information on whether an Automatic adaptation or boosting for a modulation coding scheme (MCS) is enabled, and information on whether a power boosting for the power control is enabled.

In another aspect, a wireless device for supporting transmission efficiency in a wireless communication system is provided. The wireless device includes a radio frequency unit configured to receive and transmit a radio signal; and a processor operatively coupled with the radio frequency unit and configured to: determine a message type based on information, the message type indicating a plurality of transmission types and perform adaptive measurement, data process, and power control according to the message type.

Advantageous Effects

This invention provides an enhanced communication system including a new form of a carrier (or cell) to improve interference problems between pluralities of cells. Also this invention provides a small cell cluster with different coverage, which can be used for data transmission. More details, this invention performs adaptive measurement, data process, and power control corresponding to a message type, the UE can handle various messages at the same time. Also this invention transmits a reservation request using an uplink channel to a serving cell before RACH procedure if it is needed, and transmits SRS with a predetermined power or adaptive power within the small cell cluster. Therefore, this invention may keep benefits of better offload, Quality of Experience (QoE) and Quality of Service (QoS) for UEs in cell-edge and carrier extensibility as well. Thus, more efficient and accurate cell planning and data scheduling are supported in this invention.

MODE FOR INVENTION

Figure 1:
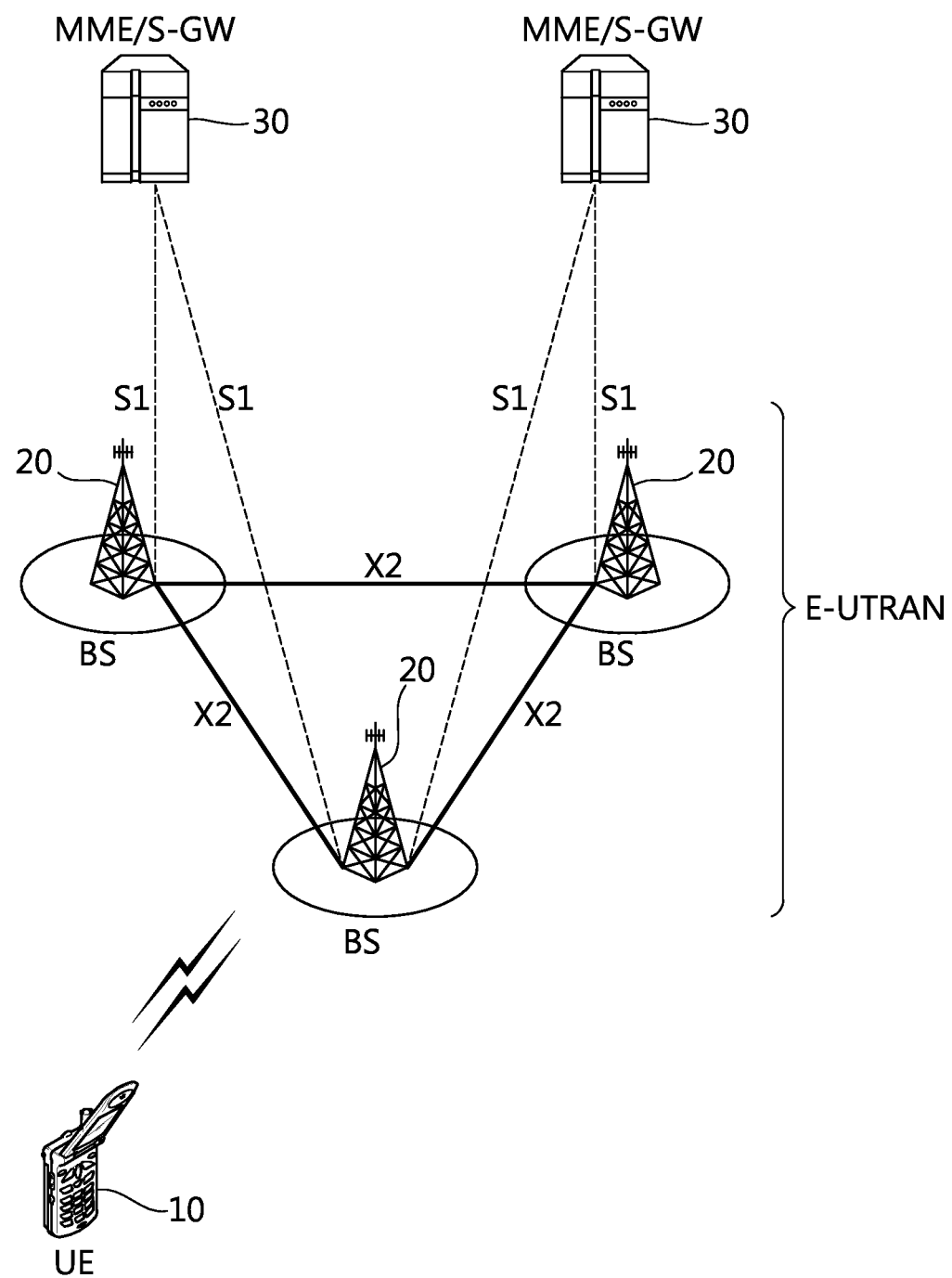
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
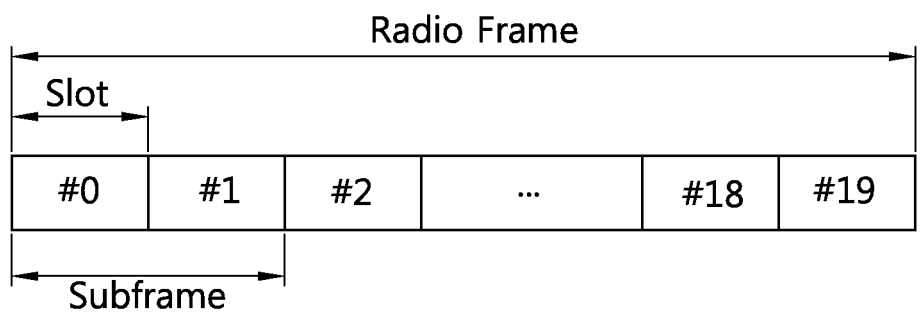
FIG. 2 shows a structure of a radio frame to which the present invention is applied.

FIG. 2 shows a structure of a radio frame to which the present invention is applied.

Referring to FIG. 2, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration (configuration) of the CP (Cyclic Prefix).

The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference.

Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

Figure 3:
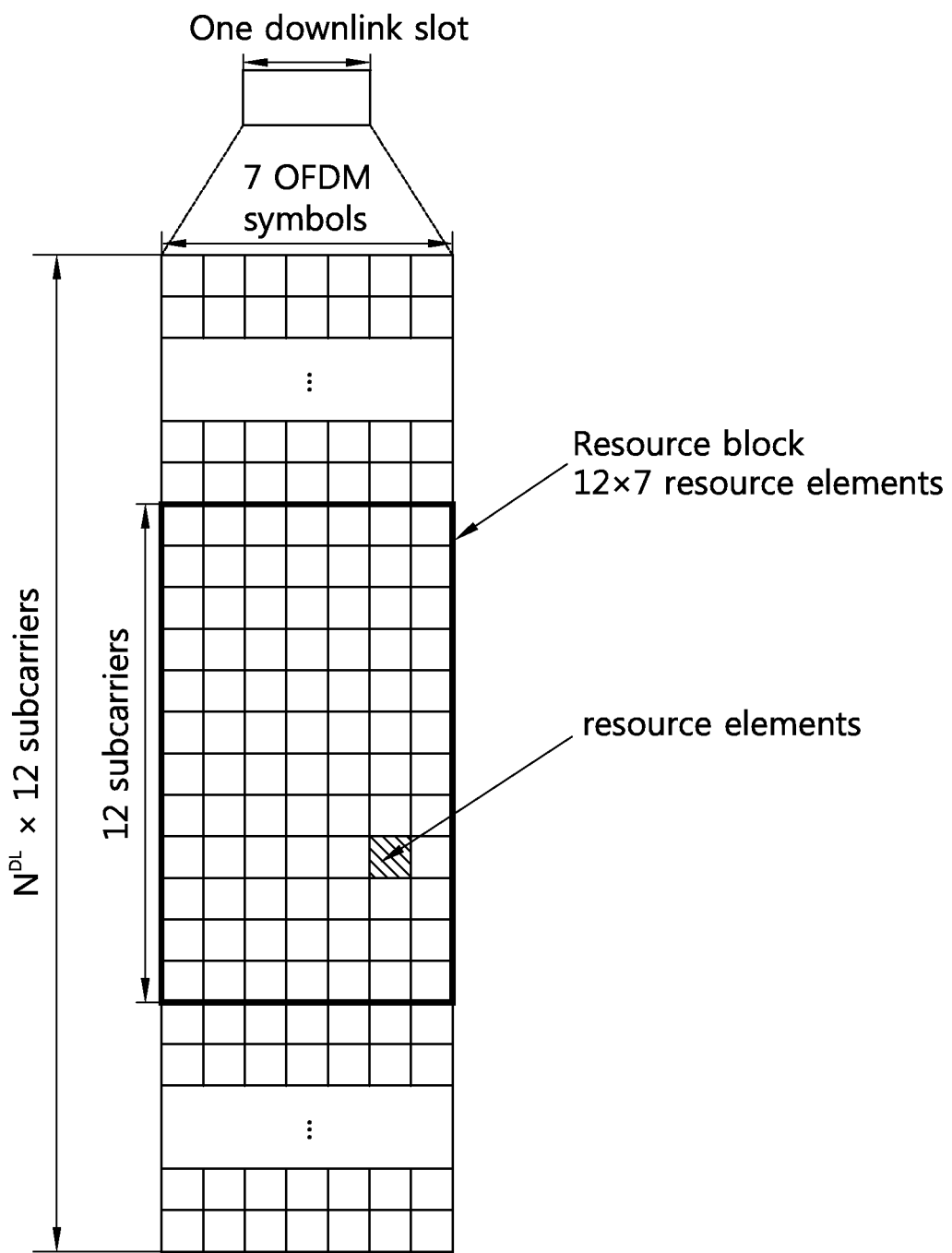
FIG. 3 is an exemplary diagram showing a resource grid for one downlink slot to which the present invention is applied.

FIG. 3 is an exemplary diagram showing a resource grid for one downlink slot to which the present invention is applied.

Referring to FIG. 3, the downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7(or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
|---|---|---|---|
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

Figure 4:
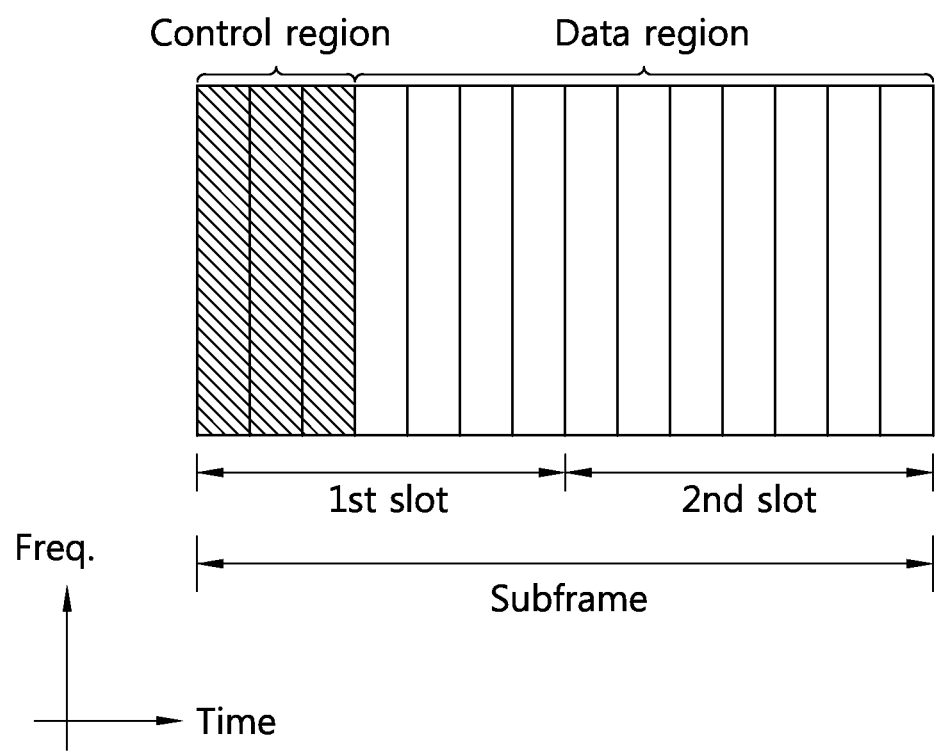
FIG. 4 shows a structure of a downlink subframe to which the present invention is applied.

FIG. 4 shows a structure of a downlink subframe to which the present invention is applied.

Referring to FIG. 4, a subframe includes two slots. The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated.

Examples of downlink control channels used in the 3GPP LTE include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH), that is, a downlink physical channel, is described below.

A PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs.

The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI. Table 2 shows DCIs according to a DCI format.

TABLE 2

| DCI format | Description |
|---|---|
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |
| 3A | Used for the transmission of a TPC command for a PUCCH and PUSCH including single bit power coordination |

The DCI Format 0 indicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH which is referred to as a downlink (DL) grant, resource allocation of a PUSCH which is referred to as an uplink (UL) grant), a set of transmit power control commands for individual UEs in any UE group and/or activation of a voice over Internet protocol (VoIP). The following Table 3 shows the DCI of Format 0 which includes uplink resource allocation information or an uplink grant.

TABLE 3

Carrier indicator—0 or 3 bits
Flag for identifying Format 0/Format 1A—1 bit, 0 indicates Format 0, 1 indicates Format 1A
Frequency hopping flag—1 bit, is a Most Significant Bit (MSB) corresponding to resource allocation at need and used to assign multiple clusters.
Resource block assignment and hopping resource allocation—$\lceil \log_2(N_{RB}^{UL}(N_{RB}^{UL} + 1)/2) \rceil$ bits
  PUSCH hopping (corresponding to only single cluster assignment):
    $N_{UL\_hop}$ MSBs are used to obtain an $\tilde{n}_{PRB}(i)$ value.
    $(\lceil \log_2(N_{RB}^{UL}(N_{RB}^{UL} + 1)/2) \rceil - N_{UL\_hop})$ bits provide the resource allocation of the first slot of an uplink subframe.
  In single cluster assignment, non-hopping PUSCH
    $(\lceil \log_2(N_{RB}^{UL}(N_{RB}^{UL} + 1)/2) \rceil)$ bits provide the resource allocation of an uplink subframe.
  In multi-cluster assignment, non-hopping PUSCH: Resource assignment is obtained from a combination of a frequency hopping flag field and a resource block assignment and hopping resource allocation field.

$\left\lceil \log_2\left(\left(\frac{\lceil N_{RB}^{UL}/p + 1 \rceil}{4}\right)\right)\right\rceil$ bits provide resource allocation in an uplink subframe.

Wherein, P depends on the number of downlink resource blocks.
Modulation and coding scheme/redundancy version—5 bits
New data indicator—1 bit
TPC command for a scheduled PUSCH—2 bits
Cyclic shift and OCC index for DM RS—3 bits
Uplink index—2 bits, only exist for a TDD operation, that is, an uplink-downlink configuration 0
Downlink Assignment Index (DAI)—2 bits, only exist for TDD operations,
that is, uplink-downlink configurations 1-6
CQI request—1 or 2 bits, a 2 bit field is applied to a UE configured using at least one downlink cell.
SRS request—0 or 1 bit.
Multi-cluster flag—1 bit.

Here, the flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

In Table 3, for example, if the resource allocation field has 13 bits in a band of an FDD 20 MHz, an uplink grant has a total of 27 bits except a CIF field and a CRC field. If the length of bits determined as the input of blind decoding is 28 bits, an eNB makes the uplink grant the total number of 28 bits by adding the redundant bits of 1 bit to the uplink grant at the time of scheduling. Herein, the all the redundant bits may be set to 0 because they do not include special information. Of course, the number of redundant bits may be smaller than or greater than 2.

The wireless communication system of the present invention uses blind decoding for Physical Downlink Control Channel (PDCCH(or ePDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

An enhanced PDCCH (ePDCCH) which can be multiplexed with PDSCH can be employed to support multiple Scells of the CA. The ePDCCH can be one of solutions of limitation for a PDCCH transmission or new control information transmission of near future commination system including a new type of carrier. The ePDCCH can be placed in data region which conveys control information. So, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in MBSFN subframes in NC and how many ODFM symbols will be allocated if used can be configured via RRC signaling. Further TM10 and new TM can be considered for new carrier type as well. Hereafter, new carrier type refers to a carrier where all or part of legacy signals can be omitted or transmitted in different manners. For example, a new carrier may refer a carrier where CRS may be omitted in some subframes or PBCH may not be transmitted. A new carrier may not mean that Rel-11 and below UEs may not be able to access the carrier. However, it is expected that Rel-11 and below UEs may not achieve the same performance compared to legacy carrier due to a certain features lacking such as continuous CRS transmission.

Figure 5:
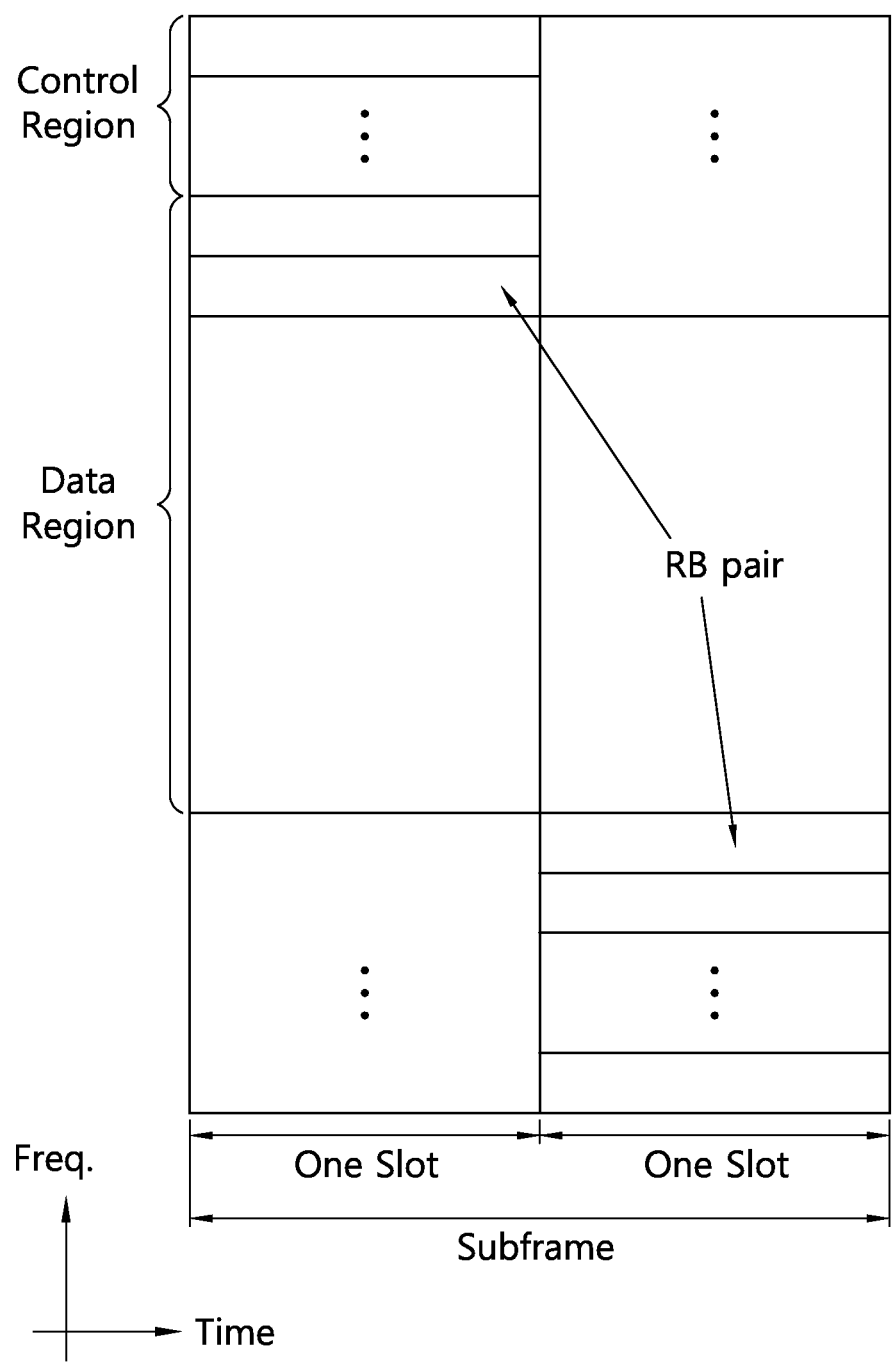
FIG. 5 shows an example of a structure of an uplink subframe carrying an ACK/NACK signal to which the present invention is applied.

FIG. 5 is a view illustrating an example of a structure of an uplink subframe carrying an ACK/NACK signal to which the present invention is applied.

Referring to FIG. 5, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair is resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. Meanwhile, as the increased demands for the high data rate transmission, the mobile communication system composed of aggregated multiple CCs (component carriers) is being researched.

This invention provides a few solutions to support efficient transmission within a small cell cluster. More specifically, this invention provides a Quality of Service (QoS) for adaptive UE behaviors, such as a UE reservation request and a UE monitoring and measurement within the cluster. The scenario or system environment for this invention can include a macro and a small cell carrier-aggregation (CA), inter-site CA which supports UEs with multiple RX capabilities. Or the invention can include a scenario that a UE is connected to a small cell as PCell. More specifically, small cells considered in this invention may belong to a small cell cluster. This would be more effective in a dense small cell deployment. In this invention, interference coordination among cells would be essential as multiple small cells may be competed with each other to utilize the channel efficiently.

Considering diverse characteristics of applications such as real time multimedia application, real-time machine type communication or VoIP or file transfer, it is natural to consider different QoS mechanisms per flow. At this point, QoS mechanisms are applied in higher layer above physical layer and thus once physical layer receives data from the upper layer, it treats all data transmissions/receptions equally regardless of QoS requirement of each data. This would degrade the effectiveness of QoS mechanism as physical layer applies all the physical layer aspects equally to the data. This invention proposes dynamic QoS configuration and UE behavior mapping at the physical layer to address this drawback. A example would be to not allow retransmission for real-time data with decreased code rate (or other means to improve the reability such as repetition or bundling).

Dynamic QoS Configuration and UE Behavior Mapping scheme in this invention are described as followings. In current LTE system or next future system, it is predicted that there are a few mechanisms which can be dynamically applied for supporting various applications's needs. Those functions include Semi-Persistent Scheduling, TTI (Transmit Time Interval)-bundling, HARQ-ACK procedures, power boosting, MCS boosting, power control, etc. For example, with power control, it can include configurability to use either absolute power control or accumulated power control for uplink transmission where absolute power control is to use the assigned power and accumulated power control is to add uplink power with the assigned power from DCI.

A scenario that the serving cell may change dynamically e.g., amorphous RAN can be considered, in this case, it may be not sufficient to utilize those techniques based on semi-statically configuration. For example, setting up and tearing down a SPS session may consume considerable overhead in a scenario where the usable subframe changes dynamically or the serving cell/TP changes dynamically. Moreover, the number HARQ process (e.g., 8 in FDD system) supported at the current specification may not be sufficient to handle high data rate particularly for HD-video real-time streaming. For those applications, it is much better to continuously transmit new data without running HARQ process. If HARQ process runs, a new data can be transmitted every 8 msec at the best case. However, without HARQ, new data can be transmitted in every subframe. In real-time video streaming, reliability per subframe level may not be so essential. Yet, high data rate is important.

For these reason, the invention considers and provides solutions for QoS aspect and treats all data with different priority and characteristics which is not equal. All decisions on QoS requirements can be determined at higher layer as example. As mentioned, this invention provides to consider a few things to reflect QoS requirements, thus it provides a better service and resource utilization in dynamic environments.

First of all, this invention defines a message type which is dynamically indicated to define a UE behavior, and this invention defines a handling scheme for the message.

In terms of the message types, a Dummy message can be defined as a type, that is, it is a message used for CSI measurement, interference measurement, or initial testing, etc. Upon receiving the dummy message with a predetermined Message Type Indicator Index, the UE can be expected to measure CSI based on the message or on the subframe without triggering any HARQ-ACK process.

A Real-time message can be also defined for a real-time application such as VoIP, D2D chat, etc. Upon receiving the real-time message, the expected behavior or assumption of the UE may include that TTI bundling is enabled for the data and HARQ-ACK may be disabled. The real-time message can be indicated by a DCI. Also, this may be used along with SPS configuration such that a SPS configuration is configured and activation/deactivation is performed via a message type=[REAL-TIME, SPS configuration index] in the DCI. A different point from a regular SPS activation/deactivation is that it still requires transmitting a DCI to transmit a data channel, yet resource allocation and other parts can follow the pre-configured SPS configuration. Thus, a compact DCI may be used for utilizing the SPS transmission. This approach is beneficial when the UE may have a situation where SPS configurations each are different per each transmission due to dynamic switching or change of U-Plane CC.

For example, the UE is served by a set of small cell cluster with cc1, cc2, cc3, and then the UE can be configured with three different SPS configurations for resource allocation to reduce DCI overhead for persistent transmission. A transmission point may change every time that SPS transmission occurs as cc1→cc2→cc3→cc1→cc2 by indicating a message type and/or SPS configuration index. By setting up a message type along with the SPS configuration index, the UE may assume that a HARQ-ACK can be omitted which may be a bit complicated in a small cell cluster to decide a CC to transmit a HARQ-ACK. If HARQ is enabled, the SPS configuration may include a HARQ-ACK destined for TP/CC as well.

And a message of Web pushing or pulling data includes that it can be used for an application which does not have delay-sensitivity nor require very high reliability so that retransmission may not be necessary. Based on higher-layer configuration, HARQ-ACK timing and the number of trials can be decided for this category data.

A File download such as FTP-like applications includes that this message type can be used for an application which is not sensitive on delay but requires high reliability. For this type of application, between eNB and UE, or between UEs may perform additive-increase/multiplicative-decrease (AIMD)-like MCS adaptation, where a MCS level adaptation occurs even without explicit signaling. In particular, A/N repetition, e.g., use multiple PRBs instead of one PRB where first A/N uses one PRB, second A/N uses two PRBs, the third A/N uses four PRBs, etc may be used as well.

ent combination of functionalities are applied differently per UE capability, this can be semi-statically configured as well rather than dynamic indication via DCI. Based on UE capability, the network can configure the set of functionality or the set of expected behaviors to the UE. For example, dummy type can be configured to a UE with very low power availability and low processing power.

Figure 6:
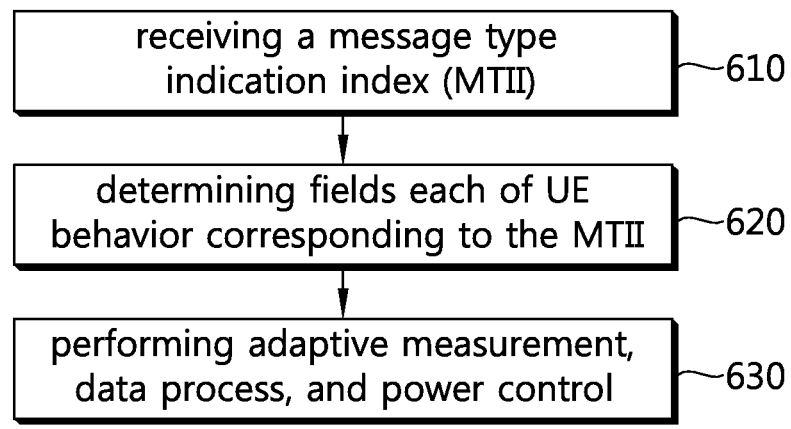
FIG. 6 shows an exemplary time flow for handling adaptive data and control according to a message type for application(s) as exemplary embodiment of the present invention.
Figure 7:
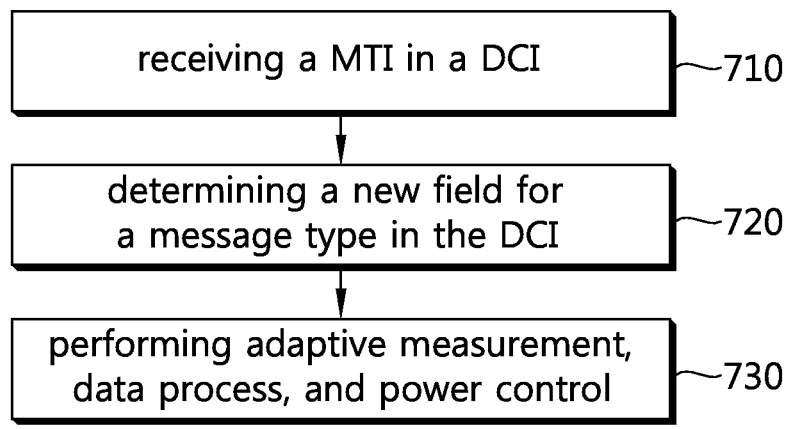
FIG. 7 to FIG. 14 show exemplary alternatives for indicating a message type as exemplary embodiment of the present invention.
Figure 8:
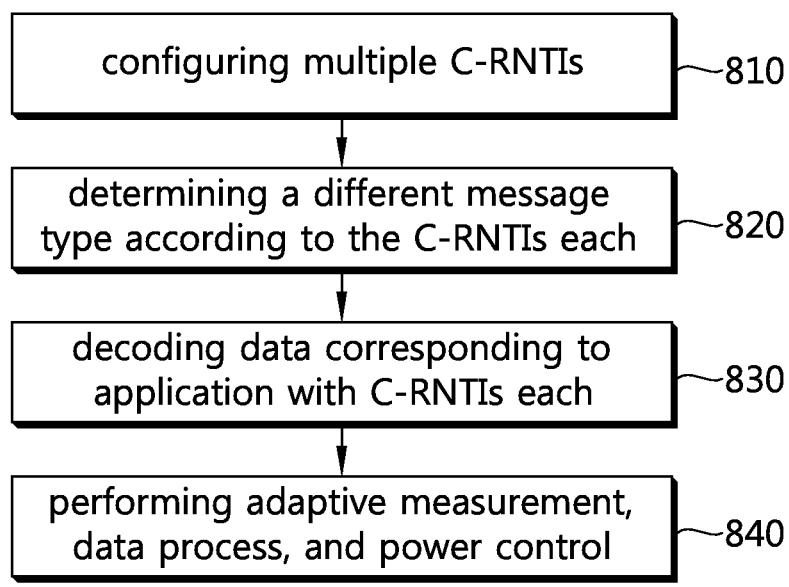
Figure 9:
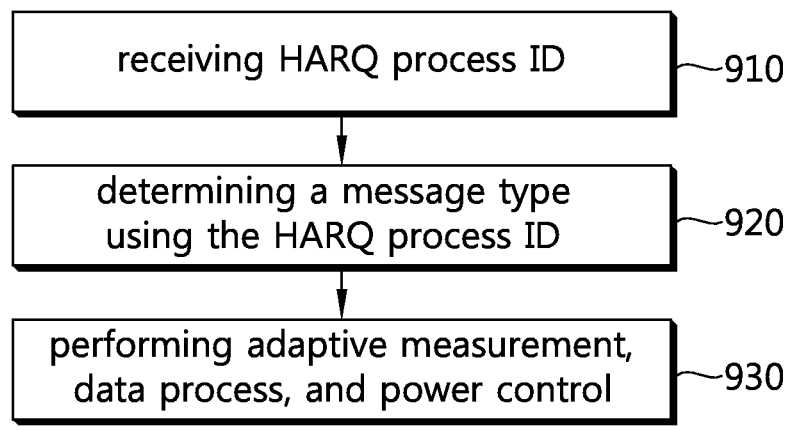
Figure 10:
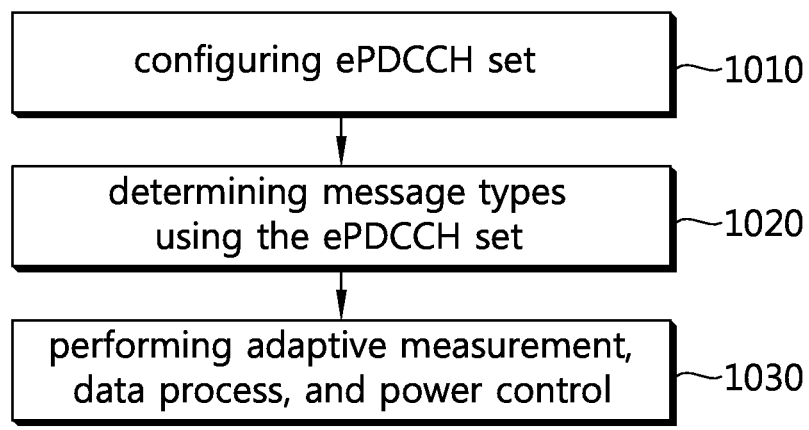
Figure 11:
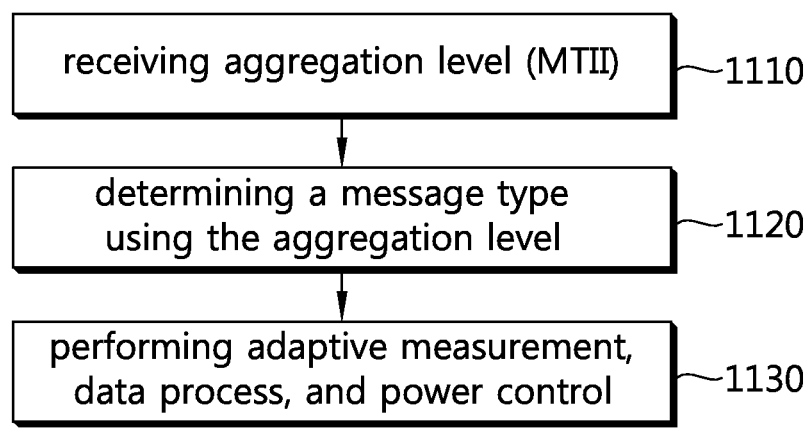
Figure 12:
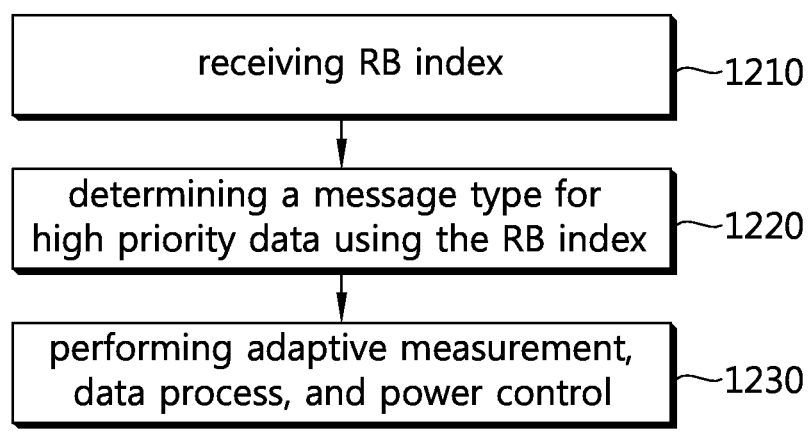
Figure 13:
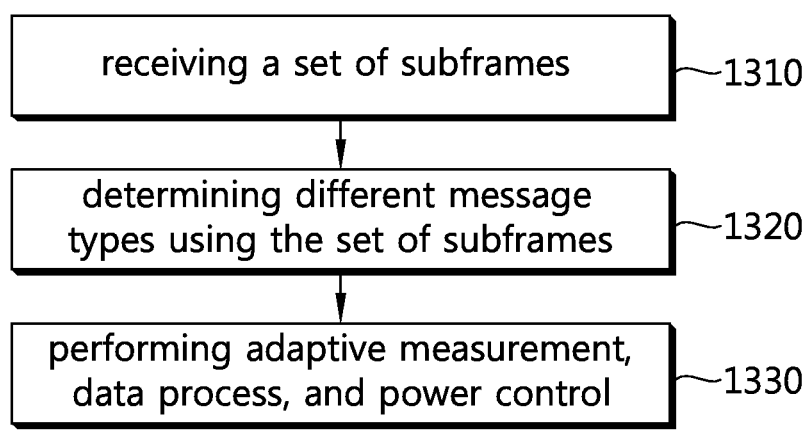
Figure 14:
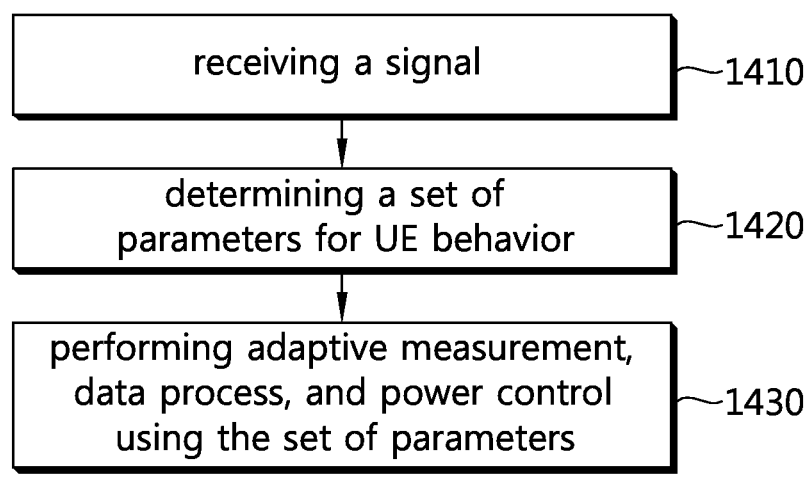

Related to the this invention, FIG. 6 shows an exemplary time flow for handling adaptive data and control according to a message type for application as exemplary embodiment of the present invention.

Referring to FIG. 6, UE can receive information on the message types each to be indicated with a predetermined value and a predefined table, a high layer signaling with a new information element (IE) (610).

More details, an Indication for the message type as an example is shown for the invention. Two approaches in this invention are shown with pre-defining UE behaviors/assumptions for each message type, and higher-layer configurations of UE behaviors/assumptions per message type. If the higher-layer configurations are used, the following table may be constructed or transmitted. In the table, each entry includes fields to include UE assumptions/behaviors for various aspects. Or the table can be predefined as specification for a module. One example of UE Behavior for each message type is shown as a table 4.

TABLE 4

| Message Type Indicator Index | HARQ timing (regular by default) | TTI bundling (disabled by default) | Automatic MCS adaptation (disabled by default) | A/N Repetition (disabled by default) | Trigger CSI measurement (disabled by default) | Relay (copy & forward) (disabled by default) | PDSCH Power Boosting | MCS Boosting |
|---|---|---|---|---|---|---|---|---|
| 0 | 0 | Disabled | Disabled | Disabled | Enabled | Disabled | 0 dB | Disabled |
| 1 | 0 | Enabled | Disabled | Disabled | Disabled | Disabled | 3 dB | Enabled |
| 2 | 1 | Disabled | Disabled | Disabled | Disabled | Disabled | 0 dB | Disabled |
| 3 | 2 | Disabled | Enabled | Enabled | Disabled | Disabled | −3 dB | Disabled |
| 5 | 0 | Disabled | Disabled | Disabled | Enabled | Enabled | 0 dB | Disabled |

A type of message for Delay Tolerant Application includes that it can be used for an application which may utilize a Delay-tolerant networking (DTN) architecture for a bundle packet such that the UE may have to store certain information and may transmit A/N or data in a burst fashion upon the link available.

A Data Relay can be used for a relayed data by the UE. For example, D2D application is used where data is forwarded by the eNB or UE and the receiving UE is supposed to relay the data as it is, the UE relays the data to the serving cell upon scheduling as if a regular data. HARQ-ACK may be transmitted to the sender or not maybe based on higher-layer configuration. This type of a message can be used for eNB to eNB communication where two eNBs are not reachable each other so that the UE may relay the packets between them.

In this invention, the message type may be included with transmission modes such that the message type is mapped to one or a few transmission modes defined in the specification. Also this invention further includes that Quality of Service (QoS) may not be limited to a message type or transmission mode. It can be used for different UE capabilities such as battery power, processing power, soft buffer size, etc. To fully utilize the features, it is expected that a UE transmits its capability to eNB to support QoS requirement and conditions of the UE. If different functionalities or a differ- As described for the example, a Message Type Indicator Index 0 can be set for the dummy message, Index can be is set for the real-time message, and Index 2 can be set for the web data, Index 3 can be set for the file download . . . and Index 5 can be for the relayed data. The Index or the order of the Index can be changed based on considering columns with different values.

After receiving the MTII configured by a network, the UE can check and determine fields each of UE behavior corresponding to a MTII (620) and perform adaptive measurement, data process, and power control indicated according to the MTII (630). The each field for appropriate UE behavior corresponding to a MTII can be described with the columns each in the table 4 as following. A state of field each can change to enable or disable corresponding to value of a MTII, and power boosting for PDSCH or MCS. So the UE can support dynamic usage of specific application data with priority or characteristics based on the information about the message type for the application, and support a small cell cluster efficiently for measurement, and discovery.

Hereinafter, each field describes below, firstly, a HARQ timing represents whether a HARQ process is used or not for that message type data. If it is disabled, HARQ-ACK would not be transmitted. This field may be omitted as HARQ timing value=0 can be interpreted as disabled. The HARQ timing field represents the default HARQ-ACK timing for the message type where value 0 indicates that HARQ process is disabled (i.e., not used) for that message type, 1 represents the normal HARQ process/timing is used i.e., 8 msec in FDD, 2 of the HARQ timing represents double timing compared to the normal HARQ timing e.g., 16 msec in FDD, 2 k in TDD and so on. The reason of using a value other than 1 when HARQ process is used is to increase the data inter-transmission time.

An Automatic modulation coding scheme (MCS) Adaptation is to decrease MCS level for retransmission automatically without explicit signaling. For example, every retransmission, modulation order can be decreased e.g., from 64QAM to 16QAM, 16QAM to QPSK, etc. An A/N Repetition is to increase the number of RBs or the repetition numbers used for HARQ-ACK for retransmission automatically without explicit signaling. For example, A/N on initial transmission uses 1 PRB whereas the second retransmission uses 2 PRBs for A/N transmission and the third retransmission uses 4 PRBs for A/N transmission, and so on. Alternatively, the repetition rate increases only for ACK transmission.

A Trigger CSI is similar to an aperiodic Channel State Information (CSI). The difference is that CSI measurement is performed using the received data only. Using only one sample, the calculated CSI is reported. Relay is to indicate the need of forwarding the data. A PDSCH power boosting is used to indicate power boosting used for PDSCH compared to normal where power boosting is used only in PRBs assigned by the scheduling DCI. A MCS boosting is used to indicate whether MCS boosting is used for PDSCH/PUSCH where if this field is enabled, a UE assumes that modulation order has been boosted to the next higher modulation order, for example, QPSK to 16QAM, 16QAM to 64QAM, etc using the same MCS field.

Also, this invention can provide exemplary alternatives to indicate the message type as below FIG. 7 to FIG. 14 which the present invention is applied.

Transmitting a Message Type Indicator (MTI) in a DCI can be provided; this approach is to utilize a new field in a Downlink Control Information (DCI) to indicate a message type for the scheduled PDSCH or PUSCH. Every downlink grant or uplink grant DCI may carry the MTI if dynamic QoS mechanism is enabled.

Thus, the UE can check the received MTI (710) with the new field or a reused field in the DCI (720), the wherein the MTI may be included in a DCI format 0, DCI format 1/1A, or other format DCI such as DCI format 2/2A/2B/2C with new field or the reused field. The MTI can be set with a Modulation and coding scheme (MCS) field in the DCI format 0, and the UE may control adaptive measurement, data process, and power control according to the MTI as shown the FIG. 7 (730).

Utilizing different RNTI per a message type can be provided; this approach is to allocate multiple RNTIs e.g., multiple C-RNTIs where a C-RNTI is mapped to different message type. To support this, higher layer configuration to indicate the mapping between a RNTI and message type may be required. Or, different RNTI range may be used to indicate different message type so that UE knows the message type by reading RNTI. This approach however may increase the UE complexity as it increases the number RNTIs that UE shall try.

It can be operated that the UE configures or is allocated multiple C-RNTIs according to different message types each (810, 820) based on applications which the UE supports or has priority order. And then it tries to decode the application data each corresponding to the C-RNTIs each configured (830) as the FIG. 8. Herein the network can configure the C-RNTIs and a number of the C-RNTIs for considering UE capability to meet application QoSs and overall system performance. The UE can receive information on the C-RNTIs and a number of the C-RNTIs of the messages types of applications by the higher layer configuration. Thus, the UE may control adaptive measurement, data process, and power control indicated according to the different RNTI per a message type.

Mapping HARQ process ID to a message type can be provided; this approach is to map a HARQ process to a message type. For example, HARQ process ID=0 may be used for the message type 0. Either higher-layer configuration to indicate the mapping between two or pre-defined mapping can be utilized.

For example, the UE can receive a HARQ process ID or HARQ process number with a separated signal for applications or Semi-Persistent Scheduling (SPS)-Config information element (IE) which is used to specify the semi-persistent scheduling configuration (910), and determine a message type using the HARQ process ID (or number) checked or specified SPS (920). And then, the UE performs adaptive measurement, data process, and power control indicated according to the HARQ process ID (or number) for the message type (930) with the FIG. 9.

Mapping ePDCCH set to a message type can be provided; alternatively, each ePDCCH set may be mapped to a message type. In this case, the number of supporting message types may be limited by the number of ePDCCH sets.

For this, the UE can receive and/or map ePDCCH set to a new cell or small cell to change a serving cell among multiple cells to support a corresponding application data for a message type (1010). It includes that the UE can activate at least one of CSI-RS resource or CSI process or a cell associated with the ePDCCH set to perform adaptive message process. Thus, the UE determines message types each using the ePDCCH set configured, performs adaptive measurement, data process, and power control according to the ePDCCH set mapped the message types each (1030).

Mapping aggregation level (AL) to a message type can be provided. For example, a real-time message is mapped to AL=1 or 2 with the lowest AL and a file type message is mapped to AL=8 or 16 with the highest AL. That is, the AL is mapped with an ascending order from 1 to max AL (ex, 16 in this invention, but it can be set to other bigger value for next system) corresponding to higher priority data to lower priority data. The mapping aggregation level can be configured by higher-layer or pre-determined. That is, the UE can assume that a message type by a configured or a received AL (1110, 1120), and performs adaptive measurement, data process, and power control according to the AL mapped the message type (1030), as shown the FIG. 11.

Mapping RB index to a message type can be provided. The RB index to a message type is determined by the allocated resource block index. This would be useful when eNBs coordinate among them to assign a subset of RBs used for high priority data such as real-time data. For example, five small cells sharing the frequency with 20 Mhz system bandwidth may coordinate to use RB index [0-19] [20-39] [40-59] [60-79] [80-99] by each eNB respectively to deliver real-time data where other eNBs may use either lower power or no power to protect each other s transmission.

When the UE receives the RB index only case a dynamic QoS operation is enabled (1210), the UE can assume that the allocated resource block index is indicated for the high priority data such as a real time data or other most important and proper data by the RB index (1220). And then the UE can change to measurement rule, data process number, and/or power according to the message type with the RB index (1230), as shown the FIG. 12.

Mapping a set of subframes to a message type can be provided. Different subframes to a different message type is mapped, the message type sent in the subframes is determined by a configuration. This would be useful when time-domain ICIC techniques are used where high priority data may be sent at protected subframes potentially with high power. Simply, two message types of a real-time message and a normal message may be supported if this is used or multiple message types can be used along with multiple configurations of subframes. In this invention notes that the RB index to a message type and the set of subframes to a message type may be applied together where a set of subframes and a set of resource blocks are reserved for high priority data or data requiring protection/interference coordination, and normal data or for multiple message types.

The UE can receive a set of subframes for message types weighted in power, time, and/or security, etc for the priority data (1310). Thus, the UE determines different message types using the set of subframes (1320) including that one is set with a high priority and another is set to normal from one of aspects of power, time, and/or security, etc to perform adaptive measurement, data process, and power control according to the set of subframes (1330) as shown the FIG. 13.

Semi-statically configuring by a higher layer as UE-specific can be provided. A few or the whole set of parameters may be configured to each UE semi-statically via higher layer signaling where the UE behavior follows the configured parameters. For example, if a UE is configured with HARQ timing=2, the UE is expected to follow 16 msec HARQ timing instead of 8 msec. To support this, the UE may send a capability signaling to the eNB in terms of processing power, available memory, etc where eNB can make a decision on a proper UE behavior based on UE capability. In terms of configuration, a separate configuration for uplink and downlink e.g., HARQ can be done or a configuration can be applied to equally to both downlink and uplink. Furthermore, if a very large number is configured for the HARQ timing such as 1000=8 sec, the UE may be configured with HARQ-ACK transmission channel e.g., PUCCH, RACH, SR, etc as well. When the configured HARQ timing is large value and a UE has received an uplink grant before HARQ-timing, UE shall use piggback A/Ns on the PUSCH transmission.

As described, the UE receives a RRC signal for the UE (1410), determines a set of parameters for defined UE behavior such as power, HARQ timing, and/or A/N Repetition enable/disable and times of the Repetition (1420). And then the UE can perform adaptive measurement, data process, and power control using the set of parameters using the set of parameters.

The one or a set of alternatives in this invention can be applied to support dynamic communication within a small cell cluster when the dynamic QoS is enabled or signaled by a high layer signal or indication. Also, a higher-layer configuration to enable/disable dynamic QoS mechanism may be additionally needed to support these approaches, and the UE assumes that those alternatives are applied only if dynamic QoS mechanism is enabled or a message type behavior of Table 4 may be configured. Expanding the concept of frequency-ICIC to protect high priority data briefly mentioned in the mapping RB index to the message type as above, this invention proposes a dynamic reservation technique among small cells to protect high-priority or high SNIR requiring data transmissions.

Meanwhile, this invention further provides Dynamic Reservation or UE-Initiated Uplink without Uplink Grant. In case that dynamic inter-cell interference exists, there will be occasions which may require suppressing interferences to maximize the data reliability such as for high priority data transmission or high modulation data e.g., 256QAM. For this reason, an eNB may need to schedule such a data channel at n+4th subframe, a prior reservation to secure the resource may be necessary. Similar to Relative Narrowband TX Power Restriction technique specified in LTE specification, to utilize and protect certain resource for a specific UE may be coordinated among eNBs. This invention focuses to consider a case where backhaul communication among neighbor cells may not be ideal or may not be easily feasible.

This invention considers that a serving cell is a small cell and the serving cell is within a macro-cell coverage where high priority data transmission occurs in non-ABS subframe as a Scenario 1, it assumes that potentially high interference from the macro-cell is expected. And the invention includes that a serving cell is a small cell either without macro coverage or in ABS subframe for a Scenario 2, in case, it assumes that low interference from macro cell is expected. Furthermore, it also includes that a serving cell is a macro cell and interference from small cells is expected as a Scenario 3. For the Scenario 1, coordination between the small cell and macro cell may be utilized. This invention focuses on scenario 2/3 where neighboring small cells are major interfering neighbors for a serving cell transmission/reception.

Figure 15:
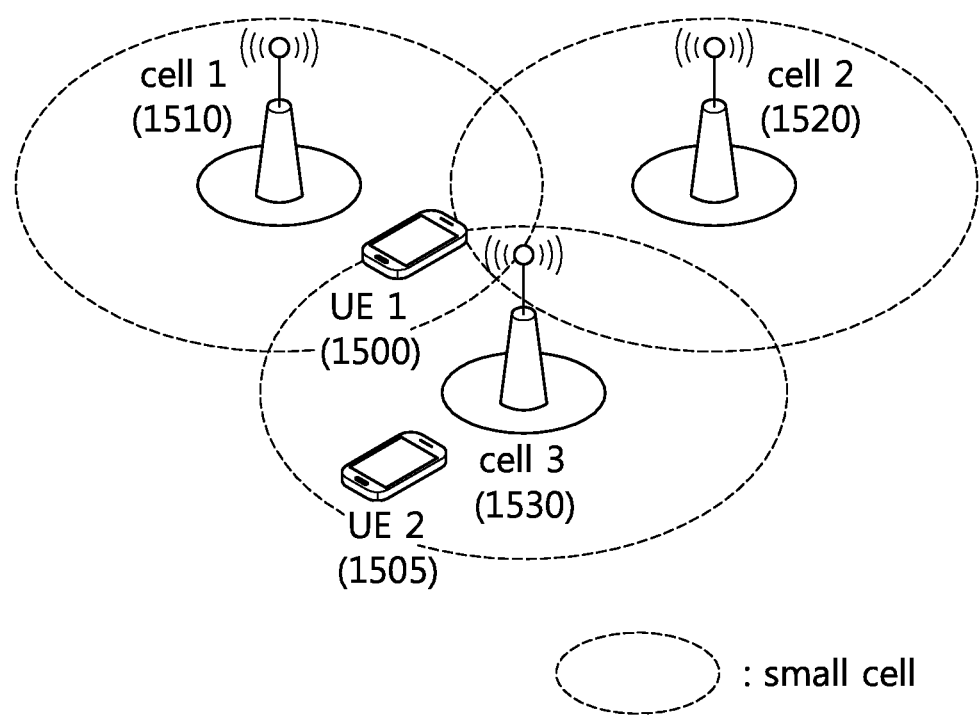
FIG. 15 shows a wireless communication system within a small cell cluster as exemplary embodiment of the present invention.

FIG. 15 shows a wireless communication system within a small cell cluster as exemplary embodiment of the present invention.

Referring to FIG. 15, when a small coverage of a small cell e.g., 50 m-100 m is considered, it is highly likely that small cells may not discover each other directly and thus may not identify interfering neighbor cells directly. Moreover, small cells each would be not controlled by the network, and thus UE involvement in terms of interference handling would be necessary. Similar to SON techniques, a UE would be expected to report discovered neighbor cells to the serving cell so that the serving cell can construct the list of neighboring cells. Furthermore, a UE is expected to perform advanced interference measurement to identify potential interfering cells. Yet, it would not be so straightforward for a small cell to estimate accurate interference to each UE or the accurate list of interfering small cells for a UE.

For example, when the number of UEs per a small cell is not given so many e.g., 10-20 in this invention, interference handling initiated by a UE may be considerable where a UE dynamically perform interference coordination activities. This invention considers the case illustrated in FIG. 15, for a transmission to UE1 (1500), Cell 1 and/or Cell 2 (1510, 1520) may need to suppress the interference, whereas for a UE2 (1505), no interfering small cell is identified.

Figure 16:
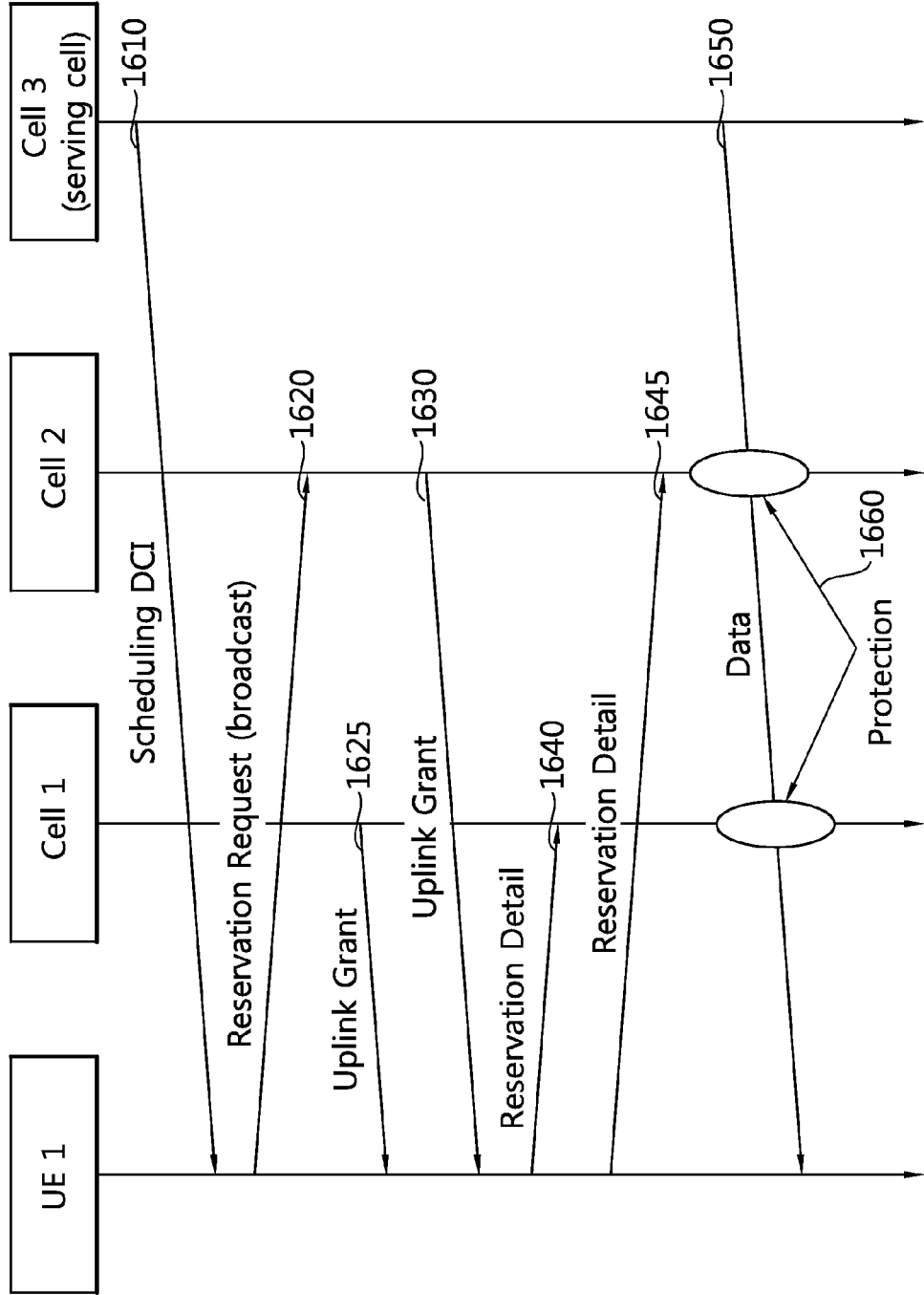
FIG. 16 shows an example of concept for handling adaptive data and resource protection which the present invention is applied.

This solution shows to utilize cross-subframe scheduling and a UE reservation request to other eNBs to protect the assigned resource. It is shown in FIG. 16. The FIG. 16 shows an example of concept for handling adaptive data and control which the present invention is applied.

Referring to FIG. 16, the serving cell (Cell 3) may transmit a DCI to schedule a high-priority data channel before the target subframe at n−4th subframe to the UE (1610), then the UE transmits the reservation request at n-th subframe which includes the assigned resource to other eNBs as to Cell 1 and/or Cell 2 (1620), so that other eNBs would not schedule a data to the requested resource at n+4th subframe.

Additional steps with an acknowledgement (1625, 1630) from Cell 1 and/or Cell 2 on the request may be considered. Furthermore, a few steps such as reservation request and reservation detail (1640, 1645) can be combined to reduce the latency and resource consumption. Furthermore, the eNBs may coordinate protection (1660) wanted resources and a UE may trigger the protection where uplink grant and reservation detail may be omitted. Also, in this invention, it notes that it may be assumed that the network is synchronized, at least one among neighbor cells and the cell range is small such that timing advance for each cell may not be used or zero. Also it considers that a UE is properly configured to transmit reservation request to neighbor cell.

For Uplink channel to transmit Reservation Request, multiple candidates are feasible in this invention as followings. Herein, a meaning of the reservation request can include that it make a cell on from a cell off with the uplink channel, it implies that a step of transmitting the reservation request can control cell on or off for a cell by the UE.

First of all, Using RACH can be applied. It can be the simplest approach to transmit RACH-like channel. To carry resource information, the RACH channel may be modified or tailored to include data portion. Or, it may send a QUERY request or uplink grant to the UE since an eNB receives a RACH or a modified/tailored RACH from a UE, so that the UE is able to transmit PUSCH with resource information and other necessary information for data protection. To utilize the RACH for reservation request, the resource and PRACH preamble shall be determined. Similar to other uplink channel, either a fixed location may be assumed for a PRACH transmission shared by multiple UEs or a dedicated region may be assigned per cell where the region index may be tied with its cell ID or higher-layer signaled. PRACH preamble is assumed to be assigned by the serving cell which can be used for reservation request or preamble index may be determined based on the user ID.

On the other hand, Using PUCCH can be applied. This approach is to use PUCCH with PUCCH offset=0 or dedicated offset which is assigned to reservation request in prior, the dedicated offset may be higher layer configured. For example, small cells would not assign offset=0 or dedicated value to any serving UE, so that the PRB can be reserved for the reservation request. The PUCCH may carry data or eNB may schedule uplink grant to receive PUSCH for completing reservation process. Alternatively, a set of resources used for cells within a cluster may be reserved for the transmission where each cell uses a dedicated resource based on its cell ID or a virtual cell ID. A UE may use this resource for transmitting reservation request and/or RRM report on the target cell. In detail, within a cluster, the offset for PUCCH implicit resource may be reserved to a value and shared by cells within the cluster. In the cluster, the offset for PUCCH resource may be fixed, it is called PUCCH_offset_within_cluster. To differentiate and avoid interference among cells, each cell within the cluster may use a delta_PUCCH_offset. It includes that PUCCH offset for each cell is determined by PUCCH_offset_within_cluster+delta_PUCCH_offset.

Whereas, when user ID assigned uniquely within a cluster and PUCCH resource determined by PUCCH_offset_within_cluster and delta_PUCCH_offset of the target cell are used, a UE may be able to transmit PUCCH to a target cell. When a broadcast is used, PUCCH_offset_within_cluster can be used to determine PUCCH resource index.

In addition to, Using PUSCH can be applied. This approach is to dedicate a PUSCH resource for reservation request which is shared by multiple UEs. Also, Using SR can be applied. The reservation request may be transmitted using the SR resource. When a small cell receives SR from a UE, it shall grant an uplink to receive the necessary information related to the reservation request. To support this, each cell within a cluster may assign a dedicated SR resource which may be disjoint such that a few resources are reserved for SR-based reservation request, it can be called with N resources. And each cell uses a resource based on cell ID e.g., cell ID % N. Similar to PUCCH resource, resources for SR may have a starting offset configured which is shared among cells within a cluster. If it is used, SR resource is determined by a starting_offset+cell ID % N. When a UE needs to transmit a SR to a cell, it may transmit PUCCH 1/1a to that resource to trigger the indication of reservation request. When a UE generates the PUCCH, the UE may use the cluster ID or a virtual cell ID, or the user ID. When transmitting SR, the UE may report a RRM result on the target cell as well.

This reservation request would be useful for D2D slot reservation where a D2D device may request silencing of other eNBs at the request resource so that D2D communications can occur successfully. In particular, this would be useful to coordinate D2D devices belonging to different serving cells or any D2D device is out of cell coverage.

Furthermore, Semi-Persistent Reservation can be applied. Unless it is critical, in general, a reservation request for a single transmission may not be desirable due to its associated overhead. Yet, high priority data tends to occur periodically which can be configured as a SPS. Thus, a reservation request to initiate semi-persistent reservation would be desirable. When a reservation request is sent, in addition to the assigned resource or the target resource for protection, a UE may transmit the period of the protection along with the duration of the protection. For example, RB #1-#10 may be reserved for a high priority data transmission every 5 msec for the next 200 msec. It is not mandated or can be mandated whether eNB will not introduce any interference for the resource requested for the protection. If it is avoidable by beamforming, or not transmitting, it is desirable to reduce the interference. Furthermore, to protect the requested resource, eNB may choose not sending or reducing the power to transmit any scheduled RS such as TRS, CSI-RS. In this case, additional higher layer signaling to inform the fact to the UE may be necessary. Alternatively, eNB may choose sending any cell-specific RSs even in the requested resources.

Figure 17:
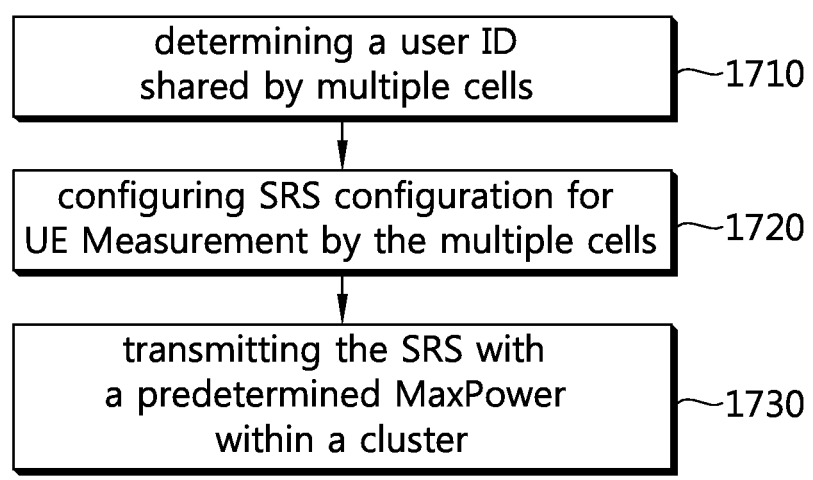
FIG. 17 shows an example of concept for sharing uplink channels within a small cell cluster which the present invention is applied.

Meanwhile, this invention further provides to share uplink channels within a small cell cluster. For convenience, this invention uses FIG. 17 which shows an example of concept for sharing uplink channels within a small cell cluster which the present invention is applied. The sharing of uplink channels further includes steps on a usage of common ID for the small cell cluster, SRS configuration, and power control, etc.

A user ID shared by multiple cells is explained as below (1710). When a UE is served by a set of cells such as a macro and a few small cells or a small cell cluster, it is desirable not to perform hard hand-over among cells. Rather, based on coordination among cells, it would be desired that the UE can smoothly change its serving cell by keeping the unchanged credential cell or ID. For this, the present invention shows that a user ID can be interpreted as a credential by other cells so that the UE does not have to go through core network to get reconnected to another cell.

To support this, per small cell cluster or a group of small cells, core network may have to guarantee that unique RNTI is assigned to a certified/authenticated user. When a UE changes a serving cell, the new target cell may query the validity of the user RNTI in terms of security and then continue services if it is still valid. New procedure to query and respond of user RNTI validity can be considered. When a UE is connected to a cell without the given user ID, the cell will go through initial RRC connection procedure. A MME or a GW assigns a user ID or user credential which can be shared by neighbor cells connected to the same MME or GW without going through another RRC connection or RRC connection reestablishment process. When a UE switches a cell from one to another by transmitting data and control with this user ID or user credential, the UE can be certified by the target cell. Of course, the UE can determines whether the user ID shared by multi cells in a small cell cluster is used or not, and send a response including a bit or signal to indicate whether the user ID is used or not to a cell in a small cell cluster. This message can be sent by msg3 at random access procedure or sent by PUSCH or encapsulated in PUSCH. This ID may be used instead of C-RNTI. Or, when a UE enters a different small cell cluster or a macro cell, C-RNTI assigned by the first serving cell may be used as the unique user ID within the cluster. Or a UE is configured with both C-RNIT and user ID used for data transmission/reception within a cell and data transmission/reception within a cluster. When the target cell does not recognize the user ID, it shall reject the UE so that UE may find another cell to switch over or initiate cell reselection and/or handover procedure. This invention notes that this ID would be used when UE is in RRC_Idle as well. In particular, this unique ID is essential in Reservation Request procedure as the UE requires transmitting uplink channel to neighbor eNBs which are not RRC connected.

If the reservation request or any other uplink transmission that a UE may perform for one or more neighbor cells is transmitted based on different uplink channel, herein signal generation may be altered to accommodate this new transmission. Some examples are shown in below. In PUSCH based transmission, A/N and RI reserved bits can be included when PUSCH is used, it shall be assumed that there is no bits are reserved for A/N or RI including repetition if PUSCH is used for reservation request or uplink transmission towards one or more neighbor cells (i.e., not to the serving cell). Scrambling sequence generator can generate $c_{init}=n_{RNTI} \cdot 2^{14}+\lfloor n_s/2 \rfloor \cdot 2^9+N_{ID}^{cluster}$ where $n_{RNTI}$ is the user ID allocated for the cluster and $N_{ID}^{cluster}$ is the ID for the cluster if given to the UE or $N_{ID}^{cluster}=0$. If the cells within the cluster is aligned with SFN, $n_s$ is the slot number of the serving cell or $n_s$ can be fixed to a constant value such as two (2). Throughput PUSCH generation, a cluster ID is used if given. Otherwise, cell ID shall be assumed to be 0 or the same as to the macro cell ID if there is a macro that UE is connected to. Modulation can be included as either BPSK or QPSK. Only one codeword and one layer can be used. There is no spatial multiplexing. And PUSCH resource can be used that a UE is configured with PUSCH resource used for reservation request or other uplink transmission to neighbor cells. And $n_{DMRS,0}^{(2)}$ and $w^{(\lambda)}(m)$ for this message regardless of uplink-related DCI can be used. In summary, a user ID assigned uniquely within a cluster shall be used along with a cluster ID to generate uplink signal for a reservation request or any uplink signal to non-serving neighbors.

Furthermore, sounding reference signal (SRS) configuration for UE measurement by small cells in this invention is described (1720). To discover UEs which are interfering and are interfered by the eNB or a small cell, eNB may monitor UEs based on SRS or any uplink signals. To allow overhearing the SRS from a UE, some coordination is necessary as each UE is configured with cell-specific and UE-specific SRS related configuration parameters.

Firstly, an exchanging UE SRS configuration among eNBs can be applied for an alternative, if this approach is used, there may be no change at UE side except for the transmission power which may be assumed to be the maximum regardless of power configured by higher layer for SRS transmission or a pre-fixed power. A UE may be higher-layer configured with a power value used for SRS transmission and if configured with such a value, the UE may ignore power adaptation for SRS transmission. Alternatively, maximum power configured or constant power following the configuration may be applied only for a SRS configuration assuming a UE may be configured with multiple SRS configurations. Or, the configured power may be limited to a subset of subframes where SRS can be transmitted where the subset can be higher-layer signaled separately.

Secondly, additional UE SRS configuration used for neighboring eNBs is used for another alternative. This approach is to use an additional SRS configuration which is intended for neighboring and serving eNBs. This additional SRS configuration can be used for either aperiodic SRS or periodic SRS transmission. When it is configured, UE may use a cluster ID and user ID unique within a cluster for SRS generation. It may be assumed that the SRS bandwidth would be center 6RB unless a UE is configured otherwise. Or, UE may assume the SRS bandwidth is same to the serving cell s bandwidth unless otherwise configured. When this additional SRS collides with SRS for the serving cell, SRS for the serving cell is dropped or the additional SRS for neighbor cells may be dropped. Since the quality can be measured by SRS transmitted for neighbor cells as well by the serving cell, it is desirable to drop SRS to serving cell.

There are two types of configuration. For explicit configuration, UE may be configured with this additional SRS configuration via higher-layer signaling and small cells exchange this configuration with each other. This will simplify the configuration and resource configuration. However, this requires some coordination among small cells and may not prevent colliding SRS resources among users. Another approach, for implicit configuration, the user ID assigned uniquely within the cluster may be used to find the SRS configuration where SRS configuration index is determined by User ID % N where N is the number of feasible SRS configuration assuming SRS configuration table used for neighbor cells is pre-configured or reuse the configuration table existing in the specification. Or SRS configuration index is determined by a combination of user ID and serving cell ID where index=cell ID % (user ID % N+1) or user ID % (cell ID % M+1). For this additional SRS configuration, SRS bandwidth configuration (CSRS) may be fixed to a value such as zero (0) or other value. Alternatively, this can be higher-layer configured as well. For Cyclic shift value $n_{SRS}^{cs}=\{0,1,2,3,4,5,6,7\}$ which can be higher-layer configured or assumed to be fixed to a value for the additional SRS configuration.

Moreover, it may be assumed that transmission Comb is disabled when pre-configured with zero (0) is set or transmissionComb=user ID % 2. Furthermore, srs-HoppingBandwidth is either fixed to a constant or srs-HoppingBandwidth=user ID % 4. For the freqDomainPosition which is used for frequency position, a UE may be configured with $n_{RRC}$ for the additional SRS configuration or a constant value may be assumed. The configuration of this additional SRS may continue even with serving cell handover unless UE moves out of the coverage of the small cell cluster. If a UE moves to a new serving cell, if the serving cell ID changes, overall SRS scrambling may be also changed if cell ID is used. Thus, it is desirable to use cluster ID in generating SRS for neighbor cells. It can be performed that the UE is configured with a different user ID or different cluster ID. In summary, if a UE is configured with an additional SRS configuration used for neighboring cells, the UE may be configured with power for SRS transmission, period/offset, CS value, hopping related parameters. A few or all parameters may be determined based on user ID and/or {serving cell, cluster ID}.

Lastly, SRS configuration partition within a cluster can be used. This option is to share the cell-specific parameters among cells within a cluster and thus only UE-specific parameters for a UE may have to be exchanged. Even UE-specific parameters may be determined based on the user ID which further reduces backhaul data exchange. Benefit of this approach is to allow a UE to switch between cells smoothly where only UE-specific parameters may be reconfigured to adapt. However, this approach leads drawback to reduce the flexibility. For example, cells within a cluster may share srs-BandwidthConfig and each cell may different SRS subframe configurations where SRS subframe configurations may be tied with cell ID so that each UE can infer SRS configuration used per each cell upon switching from a cell to another. In terms of UE-specific parameters such as srs-Bandwidth, a UE may assume the parameter is kept the same within a cluster unless reconfigured.

Also this invention notes that the power that a UE may use for a SRS transmission to non-serving cell may be determined by the maximum UE power for a small cell environment, or the minimum UE power for a small cell environment, or a higher-layer configured maximum power for SRS transmission or higher-layer configured minimum power for SRS transmission or a pre-fixed maximum/minimum SRS power for neighboring cells.

The SRS configuration parameters for a UE within a cluster may be all UE-specific in a sense that UEs within a cell may be configured with different parameters for hopping bandwidth, and pattern for this invention. Once a UE is configured with SRS parameters, unless reconfigured with different values, UE may assume the same parameters are used even with cell switch within the cluster. When a UE is connected to a macro and a small cell cluster, parameters configured by a macro cell may be used for the small cell cluster unless a separate set of SRS parameters for the small cell cluster is configured. Alternatively, a set of entries for SRS parameters can be higher layer configured and the index to indicate the SRS configuration for the UE can be also higher-layer configured or the index is tied with user ID. The SRS-conf-index=user ID % M, where M is the number of configurations in the configured table or is tied with user ID and cell ID. Or, the SRS-conf-index=((user ID % M+cell ID % N) % M), where N is a value predefined. Instead of higher-layer configuration, a set of entries can be predetermined.

Regardless of whether one of these options is used or not, there is a need to know transmission power that the UE used to transmit SRS for neighboring cells to correctly measure the channel (1730). To support this, a UE may be configured with MaxPowerUsedConfiguration which indicates when it uses maximum power to transmit SRS, wherein the maximum power is the UE maximum power or a higher-layer configured maximum power. For example, if a UE is configured with SRS period with 10 msec and MaxPowerUsedConfiguration is four (4), the UE is expected to transmit SRS with maximum power every 10×4=40 msec. Alternatively, as mentioned before, a UE can be higher-layer configured with a constant power for SRS transmission all the time to apply to periodic and/or aperiodic SRS. When transmitting SRS, a UE may compare the configured power for neighbor cell SRS and power calculated for SRS transmission according to power control. A UE may take the maximum power among two values all the time as it should guarantee that at least the serving cell should be able to receive SRS. Or, a UE may be configured with selecting the maximum or minimum among two values.

Alternatively, a UE may be configured with periodic and aperiodic SRS configurations and a separate trigger or a neighbor SRS trigger to initiate SRS transmission for neighbor cells. A UE may be configured with a or a set of SRS configuration among multiple configurations to use for this neighbor SRS trigger in terms of period, offset, bandwidth, etc. For scrambling, the UE may use the user ID and cluster ID for the neighbor SRS transmission. When a neighbor SRS trigger is occurred, the UE transmits SRS at the earliest timeframe after 4 msec of configured SRS subframe based on the associated SRS configurations. This means that SRS transmission to neighbor cells will be triggered by aperiodic or other request only.

For example, neighbor SRS trigger is occurred at n-th subframe where the periodic SRS configuration for the serving cell is associated with neighbor SRS transmission and it is scheduled at n+6th subframe, then the UE will transmit the neighbor SRS transmission at n+6th subframe based on periodic SRS configuration. This neighbor SRS trigger can be configured and signaled with a period and a possible duration where once it is triggered, the same trigger occurs every given period until the duration ends. Additional field may be added for this neighbor SRS trigger in DCI format or a value out of four (4) SRS request field values may be used, as example, 11 is used for the neighbor SRS trigger. Or, a combination of different fields may be used to indicate the trigger or neighbor SRS transmission. Once it is trigger, a UE is expected to use either UE maximum power or a preconfigured maximum power to transmit SRS. Or, when aperiodic SRS field is present with 1 bit and the value is 0 as for no aperiodic SRS trigger or 1 as for a trigger, it can be considered as neighbor SRS trigger. In this case, the UE shall not be configured with aperiodic SRS configuration to avoid potential ambiguity between neighbor SRS trigger and aperiodic SRS trigger. In this case, a UE expects to receive aperiodic SRS request field if it is configured with neighbor SRS configuration without aperiodic SRS configuration. Herein the neighbor SRS configuration can be mapped to, a set of SRS configurations, or a separate neighbor SRS configuration.

It is a similar mechanism which can be applied to other uplink channel such as PUCCH with/without CSI and PUSCH with CSI.

More, this invention is described a SRS transmission within a cluster: A UE may be configured with a few cells belonging to a cluster where UE is expected to transmit SRS to the cells belonging to the same cluster in a round-robin fashion or weighted round-robin fashion. Or if a UE is configured by higher layer to transmit SRS to neighbor cells in round-robin or weighted round-robin fashion. For example, if a UE is configured with three small cells as candidate U-Plane CCs and higher-layer configured to transmit SRS to its U-Plane candidate cells, a UE follows the configured SRS subframe period/offset and transmits SRS to macro-cell if connected to the macro cell for C-Plane or the serving cell at the first occurrence of SRS transmission, and send SRS to a cell in U-Plane candidate cells at the second occurrence of SRS transmission and so on. In terms of transmission power, for the serving cell SRS, it may use the configured SRS power adapted by the serving cell and for other SRSs, it may use the predefined/preconfigured maximum SRS power or maximum UE power or minimum UE power or minimum SRS power. Alternatively, a serving cell may configure SRS power for each cell within the cluster.

To support a legacy UE in a small cell cluster environment, this invention provides that tight coordination/collaboration among small cells may be necessary. Furthermore, to help a faster hand-over of a legacy UE among small cells, or from macro to small cell or from small to macro cell, it would be beneficial to be able to discover a set of legacy UEs within proximity of a UE who is capable of supporting the feature.

Figure 18:
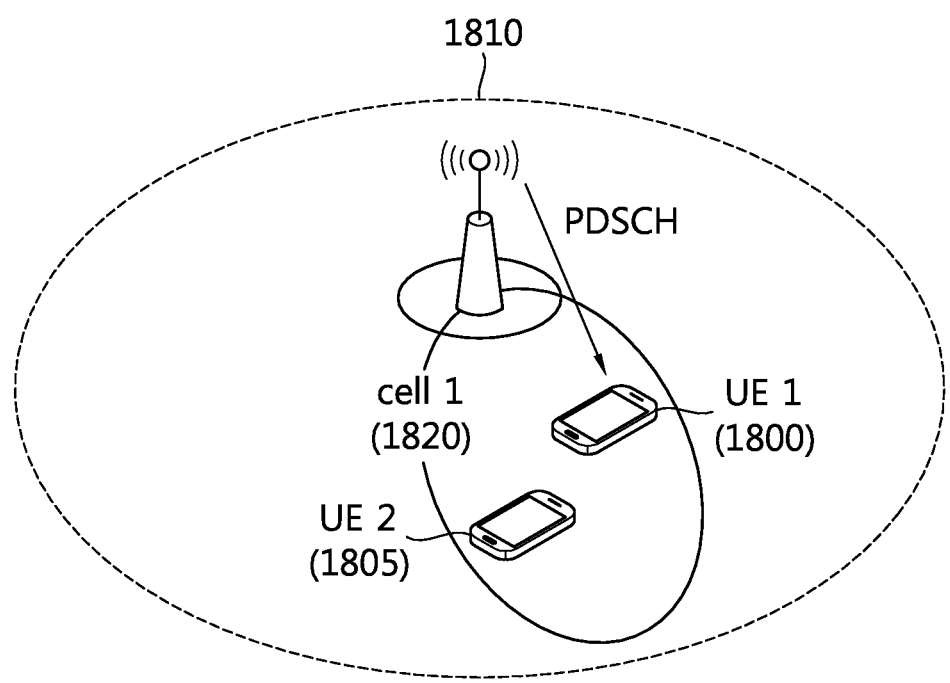
FIG. 18 shows a wireless communication system within proximity as exemplary embodiment of the present invention.

For example, UE1 and UE2 are within proximity as shown in FIG. 18, the information about the proximity may be propagated to the higher layer so that higher-level D2D application would be feasible even though UE1 or UE2 may not support physical layer D2D discovery. Moreover, when UE1 and UE2 are within proximity for a long time, if one of both switches the cell or incurs a RLF, early treatment on the other UE becomes feasible. This invention provides to detect a set of legacy UEs within proximity by using based on reading SRS or RACH from a legacy UE as first approach, or allowing a non-legacy UE to overhear downlink transmission to a legacy UE as second approach.

Figure 19:
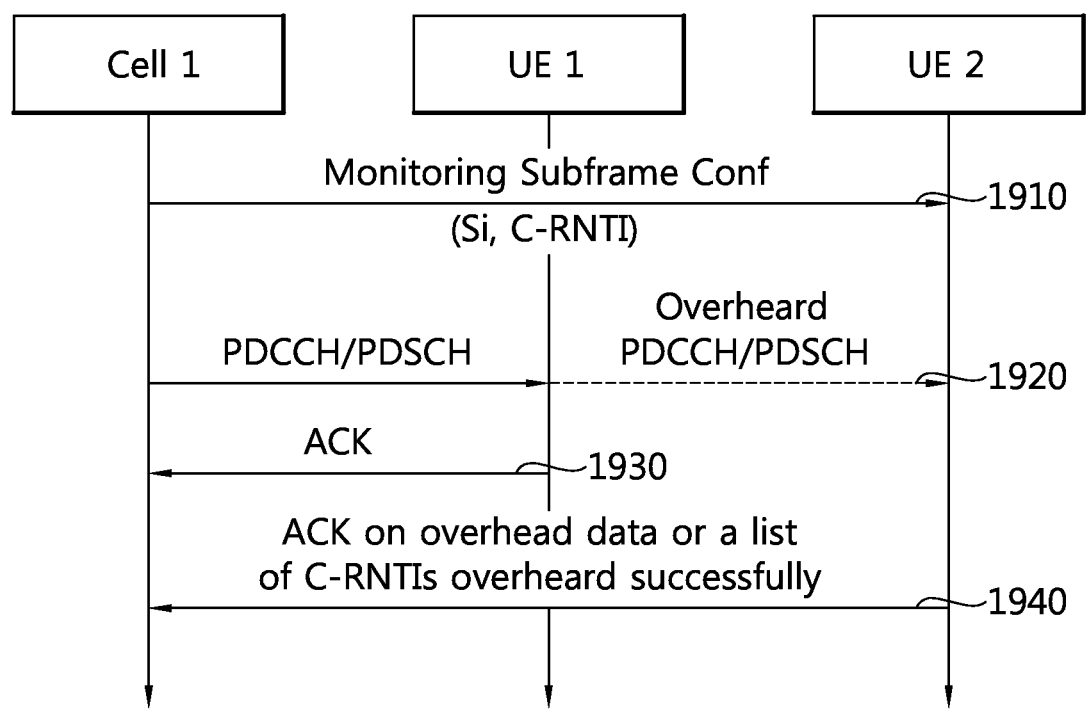
FIG. 19 shows an exemplary concept for overhearing downlink based on a proximity discovery according to an exemplary embodiment of the present invention.

FIG. 19 shows an exemplary concept for overhearing downlink based on a proximity discovery according to an exemplary embodiment of the present invention.

More details, when eNB indicates the set of SRS or RACH parameters that legacy UEs use, it may signal the power used for transmission as well for the first approach. And the second approach is to allow a non-legacy UE to overhear downlink transmission to a legacy UE using such as C-RNTI, P-RNTI, RA-RNTI.

Referring to FIG. 19, eNB may assign a monitoring downlink data periodically for a legacy UE which will be overheard by neighboring UEs (1910, 1920). The UEs successfully overhear the transmission may respond with HARQ-ACK (1930(UE1), 1940(UE2)) so that eNB can determine the proximity. In terms of transmitting HARQ-ACK, each new release UE may be configured with a HARQ-ACK resource to transmit A/N for the overheard downlink data. To support this mechanism, a UE is configured with a period/offset of monitoring subframe per each C-RNTI that the UE is supposed to monitor and A/N resource and/or A/N timing to transmit HARQ-ACK. Different from regular HARQ-ACK, only ACK can be transmitted. The UE2 can transmit not only the HARQ-ACK on overheard data but also a list of C-RNTIs overheard successfully.

The discovered proximity information can be utilized for interference coordination for both legacy and non-legacy UEs and efficient RRM request, for example, a proximity non-legacy UE is switched from a small cell to another within a cluster, the serving cell may request RRM measurement on legacy UE on the new cell to allow faster hand-over if legacy UE and non-legacy UE have been kept the proximity for a long time so far likely they are moving together. A non-legacy UE may request a set of UEs that the UE wants to monitor or tie together as well. If TDD is utilized, this can be achieved more easily with a bit. For example, eNB may indicate that the TDD configuration used in the cell is TDD configuration 0 or 1. The indication would be utilized for neighboring UE monitoring for non-legacy UEs. If configuration 0 is used, eNB may indicate the 9th subframe every radio frame would be used for neighboring monitoring where non-legacy UEs shall treat 9th subframe as a downlink subframe to listen neighbor UE's transmission. Or, a larger period may be configured as well, for example, every 100 msec, the last 9th subframe shall be used for neighbor UE monitoring. Non-legacy UEs may report the list of UEs overheard by itself. The smaller power is assumed to be configured by the serving cell when SRS is used for neighbor monitoring purpose.

To support this, eNB may configure the period and offset of a subframe or a set of subframes used for neighbor monitoring and the list of UE C-RNTIs, the list of UE C-RNTIs includes a list for legacy UEs and/or a list for non-legacy UEs. The list of UE C-RNTIs can be composed one or more lists for the legacy UEs and the non-legacy UEs. That is, the list can be made separately for each list type or aggregately for one list type. It supports to be able to decode uplink transmission from legacy UEs and non-legacy UEs. Along with this, a UE may be configured with a report configuration which includes report period and/or threshold such as threshold of received signal power. The monitored list of UEs is reported, the report may include the C-RNTI, received power, the frequency of successful reception within a period, etc. For example, if a report period is configured to be 1 second and the monitoring period is configured with 100 msec, the number or ratio of successful reception of each UE may be reported as well.

The proposed techniques in this invention are not limited to UEs. Similarly, each small cell may overhear SRS/RACH or downlink data to discover proximity UEs which can be used for interference coordination, hand-over decision, joint transmission and etc after discovery.

Figure 20:
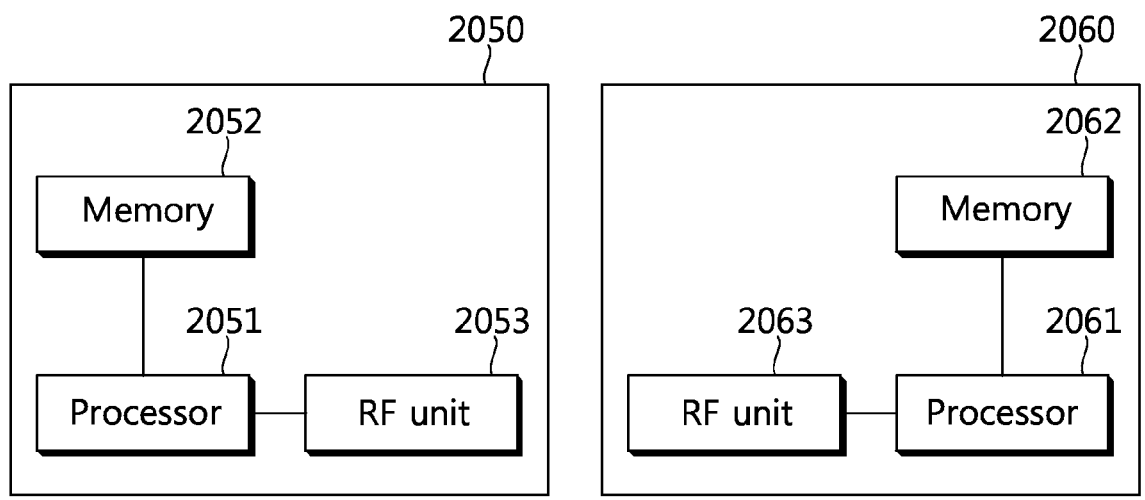
FIG. 20 shows a block diagram showing a wireless communication system according to an exemplary embodiment of the present invention.

FIG. 20 is a block diagram showing a wireless communication system according to an embodiment of the present invention.

A BS 2050 includes a processor 2051, a memory 2052, and a radio frequency (RF) unit 2053. The memory 2052 is coupled to the processor 2051, and stores a variety of information for driving the processor 2051. The RF unit 2053 is coupled to the processor 2051, and transmits and/or receives a radio signal. The processor 2051 implements the proposed functions, procedures, and/or methods. In the embodiments of FIG. 2 to FIG. 19, the operation of the BS can be implemented by the processor 2051.

Especially, the processor 2051 may configure one or more cells with different frequencies, for this invention the processor 2051 configures the cells to support Semi-Persistent Scheduling, TTI-bundling, HARQ-ACK procedures to a wireless device which utilizes different needs for various applications. The processor 2051 may generate a message type for each application data, and a signal for the message type to define the wireless device of behavior. To support QoS requirement and conditions of the wireless device, the processor 2051 may determine a message type or a set of message types corresponding application data and signaling configuration. The signaling includes a L1 signaling and determining a PDCCH (or ePDCCH) format according to a Downlink Control Information (DCI) to be transmitted to a wireless device by the BS, and L2 (as MAC signal) or L3 (as RRC signal) signaling including at least one of different RNTI(C-RNTI) allocation, HARQ process ID, an ePDCCH set, RB index, a set of subframes determined according to the message type.

For a small cell cluster, the processor 2051 may configure resource for a reservation request of the wireless device by using a procedure or a similar scheme for a RACH or similar RACH procedure, PUCCH, PUSCH, or Semi-Persistent Reservation, etc. Also the processor 2051 may configure a user ID shared by the cells, SRS configuration for measurement and, and a power further. The user ID, SRS configuration, power can be configured separately from a normal UE behavior configuration. When it determines that aggregated configuration is needed, the user ID, SRS configuration, power for the cluster can be set to be assumed from a normal configuration with offset, delta, and difference value. The SRS configuration includes periodic and/or aperiodic SRS configuration.

Furthermore, the processor 2051 may configure a set of SRS or RACH parameters between legacy UEs and advanced UEs with using as C-RNTI, P-RNTI, RA-RNTIs, and HARQ-ACK configuration. Also, the processor 2051 may configure that a dynamic QoS is enabled or signaled of the wireless device using a high layer signal or indication which is set by one among a bit to indicate the enabling or disabling with reserved bit in a physical downlink control channel (PDCCH) or an enhanced PDCCH (ePDCCH), a signal using a Medium Access Control (MAC) signal associated with a activation/deactivation, and a RRC signal with MacMain config configuration. Herein a Downlink Control Information (DCI) format 0 or DCI format 1/1A can be used.

The wireless device 2060 includes a processor 2061, a memory 2062, and an RF unit 2063. The memory 2062 is coupled to the processor 2061, and stores a variety of information for driving the processor 2061. The RF unit 2063 is coupled to the processor 2061, and transmits and/or receives a radio signal. The processor 2061 implements the proposed functions, procedures, and/or methods. In the embodiments of the FIG. 2 to FIG. 10, the operation of the UE can be implemented by the processor 2061.

Especially, the processor 2061 may configure one or more cells with different frequencies, for this invention the processor 2061 configures the cells to support Semi-Persistent Scheduling, TTI-bundling, HARQ-ACK procedures to support different QoS needs for various applications. The processor 2061 may receive and/or determine a message type for each application data, and a signal for the message type to define the wireless device of behavior. To support QoS requirement and conditions of the wireless device, the processor 2061 may determine a message type or a set of message types corresponding application data and signaling configuration. The signaling includes a L1 signaling and determining a PDCCH (or ePDCCH) format according to a Downlink Control Information (DCI) to be transmitted to a wireless device by the BS, and L2 (as MAC signal) or L3 (as RRC signal) signaling including at least one of different RNTI(C-RNTI) allocation, HARQ process ID, an ePDCCH set, RB index, a set of subframes determined according to the message type.

For a small cell cluster, the processor 2061 may configure resource for a reservation request by using a procedure or a similar scheme for a RACH or similar RACH procedure, PUCCH, PUSCH, or Semi-Persistent Reservation, etc. Also the processor 2061 may configure a user ID shared by the cells, SRS configuration for measurement and, and a power further. The user ID, SRS configuration, power can be configured separately from a normal UE behavior configuration. When it determines that aggregated configuration is needed, the user ID, SRS configuration, power for the cluster can be set to be assumed from a normal configuration with offset, delta, and difference value. The SRS configuration includes periodic and/or aperiodic SRS configuration.

Furthermore, the processor 2061 may configure a set of SRS or RACH parameters between normal function and advanced function for the dynamic QoS with using as C-RNTI, P-RNTI, RA-RNTIs, and HARQ-ACK configuration set by the BS. Also, the processor 2061 may receive and determine to configure that a dynamic QoS is enabled or signaled using a high layer signal or indication which is set by one among a bit to indicate the enabling or disabling with reserved bit in a physical downlink control channel (PDCCH) or an enhanced PDCCH (ePDCCH), a signal using a Medium Access Control (MAC) signal associated with a activation/deactivation, and a RRC signal with MacMain config configuration. Herein a Downlink Control Information (DCI) format 0 or DCI format 1/1A can be used.

In this invention, the processor 2061 may further determine and perform adaptive measurement, data process, and power control for the function of dynamic QoS. It includes determining a message type indication index (MTII) with a preconfigured table or signaled information, and determining a MTI in a DCI, multiple C-RNTIs, HARQ process ID, ePDCCH set, aggregation level, RB index, a set of subframes or new configuration to meet dynamic QoS with newly added, or modified.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. A method for supporting transmission efficiency in a wireless communication system, the method comprising:

transmitting, by a user equipment (UE), capability information including a Quality of Service (QoS) requirement to an eNodeB (eNB);

receiving, by the UE, message type indicator index (MTII) information indicating a behavior type of the UE, wherein the MTII information is received in response to the QoS requirement from the eNB, and wherein the behavior type includes first information on whether a channel state information (CSI) measurement is enabled, second information on whether a hybrid automatic repeat request (HARQ) is set, third information on whether an automatic adaptation for a modulation coding scheme (MCS) is enabled, fourth information on whether a boosting for the MCS is enabled, and fifth information on whether a power boosting for the power control is enabled; and performing, by the UE, adaptive measurement, data process, and power control according to the MTII information.

2. The method of claim 1, wherein the MTII information indicates one of a plurality of candidate behavior types that are predefined or are defined by a RRC message.

3. The method of claim 1, wherein the MTII information is received in a Downlink Control Information (DCI) on a control channel, the MTII information including an indicator indicating the behavior type.

4. The method of claim 1, wherein the MTII information is obtained from a radio network temporary identifier (RNTI) by which a control channel is detected, the RNTI indicating the behavior type.

5. The method of claim 1, wherein the MTII information includes a HARQ process ID that corresponds to the behavior type.

6. The method of claim 1, wherein the MTII information includes a set of enhanced Physical Downlink Control Channels (ePDCCHs) that corresponds to the behavior type.

7. The method of claim 1, wherein the MTII information includes an aggregation level (AL) that corresponds to the behavior type.

8. The method of claim 1, wherein the MTII information includes a Resource Block (RB) index, or a set of subframes that corresponds to the behavior type.

9. The method of claim 1, wherein the MTII information is received by a Semi-Persistent Scheduling (SPS) configuration.

10. A wireless device that supports transmission efficiency in a wireless communication system, the wireless device comprising:
   a radio frequency (RF) unit that receives and transmits a radio signal; and
   a processor operatively coupled with the RF unit, that:
   controls the RF unit to transmit capability information including a Quality of Service (QoS) requirement to an eNodeB (eNB);
   controls the RF unit to receive message type indicator index (MTII) information indicating a behavior type of the UE,
   wherein the MTII information is received in response to the QoS requirement from the eNB, and
   wherein the behavior type includes first information on whether a channel state information (CSI) measurement is enabled, second information on whether a hybrid automatic repeat request (HARQ) is set, third information on whether an automatic adaptation for a modulation coding scheme (MCS) is enabled, fourth information on whether a boosting for the MCS is enabled, and fifth information on whether a power boosting for the power control is enabled; and
   performs adaptive measurement, data process, and power control according to the MTII information.

11. A method for supporting transmission efficiency in a wireless communication system, the method comprising:
   receiving, by a non-legacy user equipment (UE), a monitoring configuration frame from an eNodeB (eNB), wherein the monitoring configuration frame includes information on a cell radio network temporary identifier (C-RNTI) of a legacy UE for detecting the legacy UE;
   overhearing, by the non-legacy UE, data and control which are transmitted to the legacy UE based on the information on the C-RNTI; and
   transmitting, by the non-legacy UE, a response frame to the eNB, wherein the response frame includes acknowledge (ACK) information on the data and the control and the C-RNTI which is overheard successfully.

12. The method of claim 1, wherein the MTII information is generated by the eNB based on the QoS requirement, and wherein the capability information further includes a battery power requirement, processing power requirement, and buffer size requirement.

* * * * *